United States Patent [19]
Sebald

[11] 4,089,233
[45] May 16, 1978

[54] AUTOMOBILE MIRROR

[75] Inventor: Walter Sebald, Goppingen, Germany

[73] Assignee: Gebr. Marklin & Cie. GmbH, Goppingen, Germany

[21] Appl. No.: 715,928

[22] Filed: Aug. 19, 1976

[30] Foreign Application Priority Data

Oct. 22, 1975 Germany .............................. 2515763

[51] Int. Cl.² .............................................. F16H 1/18
[52] U.S. Cl. .............................. 74/424.8 A; 74/501 M
[58] Field of Search ...................... 74/424.8 A, 501 M

[56] References Cited
U.S. PATENT DOCUMENTS

| 3,253,509 | 5/1966 | Peters | 74/501 M |
| 3,934,489 | 1/1976 | Bottrill | 74/501 M |

FOREIGN PATENT DOCUMENTS

| 2,206,825 | 5/1974 | France | 74/424.8 A |
| 344,877 | 2/1960 | Switzerland | 74/424.8 A |
| 392,720 | 5/1933 | United Kingdom | 74/424.8 A |

Primary Examiner—Benjamin W. Wyche
Assistant Examiner—Wesley S. Ratliff, Jr.
Attorney, Agent, or Firm—William Anthony Drucker

[57] ABSTRACT

An automobile mirror device comprises a mirror mounted in a carrier which is connected by a universal joint to a base. A threaded spindle, driven by an electric motor, engages a split nut held by a spring steel stirrup pivotally connected to the carrier. When the mirror is tilted by rotation of the spindle to either of its end positions, the thread will disengage the nut by forcing apart the parts of the nut.

3 Claims, 5 Drawing Figures

AUTOMOBILE MIRROR

BACKGROUND OF THE INVENTION

The invention relates to a device for actuating an automobile mirror with means for articulating the carrier of the mirror glass to the threaded spindle of the drive mechanism driven by electric motor and serving for the pivoting of the carrier, preferably in a manner in which the mirror glass can be hinged about a ball or cross-head joint and pivoted transversely of the hinge axis, by means of two devices. Here the threaded spindle carries the nut for the displacement of the carrier.

SUMMARY OF THE INVENTION

According to the invention the nut is of radial elastic construction so that its diameter increases in uncoupling manner with the purpose of uncoupling from the threading of the threaded spindle on exceeding of the displacement force of normal operation.

It is further provided according to the invention that the nut consists of two threaded shells and of a one-piece or multi-part spring stirrup uniting the two with the threaded spindle. Thus the uncoupling effect of the nut is better predeterminable and masterable than when the other spring elements are used.

OBJECT OF THE INVENTION

The object of the invention protects the electric drive motor or motors against damage, for example against over-heating.

BRIEF DESCRIPTION OF DRAWINGS

An example of embodiment with variants of the spring arrangement pressing the threaded shells against the threading of the threaded spindle is shown in the drawing, wherein.

DESCRIPTION OF PREFERRED EMBODIMENT

Figure 1:
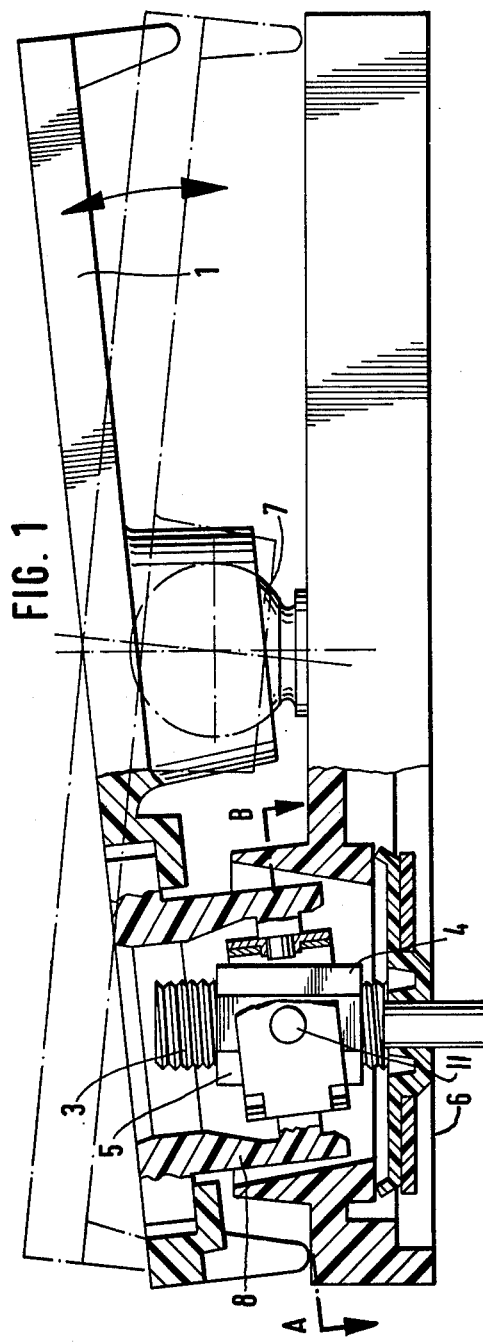
FIG. 1 shows a vertical section.
Figure 3:
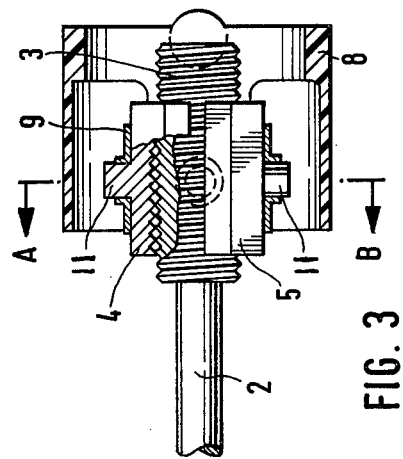
FIG. 3 represents this construction group in axial section.
Figure 2:
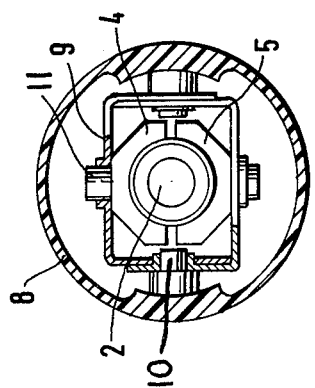
FIG. 2 represents the spindle drive in plan view.
Figure 5:
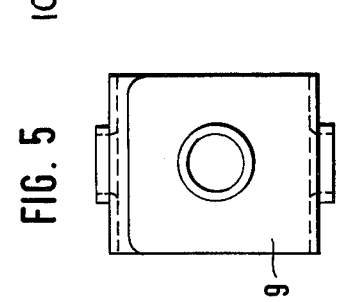
FIGS. 4 and 5 illustrate a closed rectangular ring spring for the radially yieldable nut.
Figure 4:
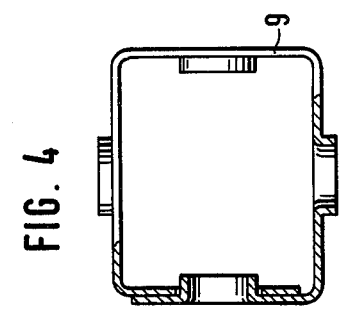

The construction group of the nut of the example of embodiment consists of two threaded shells 4, 5 which are held together by a leaf spring ring cage 9 as rectangular ring spring arrangement. The threaded spindle 2 terminates in the threading 3 (for example a round thread) carrying the nut 4, 5.

The threaded spindle 2, 3 is driven by means of an electric motor (not shown). It can be seen from the Figures that the carrier 1, which is two-dimensionally pivotable about the ball head 7 of the fixed plate 6, is articulated in cardan manner by means of the ring 8 and the pivot members 10, 11 to the construction group 4, 5, 8, 9. The ring cage is of rectangular configuration so that the nut 4, 5 can disengage radially (uncouple) from the threading into the free-running position of the threaded spindle 2, when the carrier 1 of the mirror has reached one of the two pivoted end positions, so that the threaded spindle 2, 3 continues to rotate but without conveying the nut 4, 5.

I claim:

1. An automobile mirror device comprising:
   (i) a base;
   (ii) a carrier for a mirror glass, said carrier being pivotally mounted on said base for pivotal movement between two end positions;
   (iii) a mirror glass carried by said carrier;
   (iv) a spring stirrup pivotally carried on said carrier;
   (v) a nut comprising two threaded shells, said nut being pivotally carried on said spring stirrup; and
   (vi) a threaded spindle causes said carrier to be pivoted, said spring stirrup being adapted to elastically disengage said nut from said spindle when each of said end positions is reached.

2. A device according to claim 1, wherein the spring stirrup is a rectangular ring.

3. A device according to claim 2, wherein the thread of the threaded spindle is a round thread.

* * * * *